US011045845B2

(12) United States Patent
Etzkorn et al.

(10) Patent No.: US 11,045,845 B2
(45) Date of Patent: Jun. 29, 2021

(54) DECONTAMINATION STATION AND METHODS OF MAKING AND USING THE SAME

(71) Applicant: Honda Motor Co., Ltd., Tokyo (JP)

(72) Inventors: Anthony Etzkorn, Wapakoneta, OH (US); Dane Froning, Coldwater, OH (US); Brando Garza, Quincy, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 181 days.

(21) Appl. No.: 16/582,300

(22) Filed: Sep. 25, 2019

(65) Prior Publication Data

US 2021/0086237 A1   Mar. 25, 2021

(51) Int. Cl.
*B08B 5/00* (2006.01)
*G01B 5/012* (2006.01)
*G01B 5/008* (2006.01)

(52) U.S. Cl.
CPC .............. *B08B 5/00* (2013.01); *G01B 5/008* (2013.01); *G01B 5/012* (2013.01)

(58) Field of Classification Search
CPC .. B08B 5/00; B08B 5/02; G01B 5/012; G01B 5/008
USPC ........................................ 33/503; 134/18, 21
See application file for complete search history.

(56) References Cited

U.S. PATENT DOCUMENTS

| | | | |
|---|---|---|---|
| 4,552,163 A * | 11/1985 | Biancalana | B08B 3/08 134/102.3 |
| 4,688,585 A * | 8/1987 | Vetter | A47K 7/04 118/679 |
| 4,740,221 A * | 4/1988 | Howeth | B01D 46/0067 55/302 |
| 5,339,843 A * | 8/1994 | Benedict | B08B 3/102 134/186 |
| 6,029,681 A * | 2/2000 | Gaydoul | B21B 45/08 134/56 R |
| 6,154,972 A | 12/2000 | Otsubo | |
| 6,240,651 B1 | 6/2001 | Schroeder et al. | |
| 6,431,189 B1 * | 8/2002 | Deibert | A61L 2/22 134/102.2 |
| 6,477,784 B2 | 11/2002 | Schroeder et al. | |

(Continued)

FOREIGN PATENT DOCUMENTS

| | | |
|---|---|---|
| DE | 102012109298 A1 | 6/2014 |
| EP | 1953497 A1 | 8/2008 |
| WO | 2014168935 A1 | 10/2014 |

*Primary Examiner* — Christopher W Fulton
(74) *Attorney, Agent, or Firm* — Kenealy Vaidya LLP

(57) ABSTRACT

A decontamination station that can include a head assembly and a first puck member provided on the head assembly. The core member inflow passage and the puck member inflow passage together can form an inflow passage for incoming gas. The core bore and the puck bore together can form a cleaning chamber for accepting a stylus to be de-contaminated. A gas flow can be provided into the inflow passage, through the cleaning chamber, and from the cleaning chamber out through the outlet port. The gas flow can be configured to provide decontamination of the stylus positioned in the cleaning chamber. The first puck member can be removably disposed upon the head assembly for supplementing the first puck member, for adjusting height of the cleaning chamber, by removing the first puck member or adding one or more additional puck members.

20 Claims, 9 Drawing Sheets

(56) References Cited

U.S. PATENT DOCUMENTS

| | | |
|---|---|---|
| 8,273,187 B2 | 9/2012 | Asplund et al. |
| 2002/0023667 A1 | 2/2002 | Pham |
| 2004/0000325 A1* | 1/2004 | Buckholtz ................ B08B 1/00 |
| | | 134/6 |
| 2010/0296068 A1 | 11/2010 | Shibazaki |
| 2014/0082865 A1* | 3/2014 | Takayanagi ............... B08B 5/00 |
| | | 15/1.51 |
| 2015/0182650 A1* | 7/2015 | Leight ...................... A61L 2/24 |
| | | 422/292 |

* cited by examiner

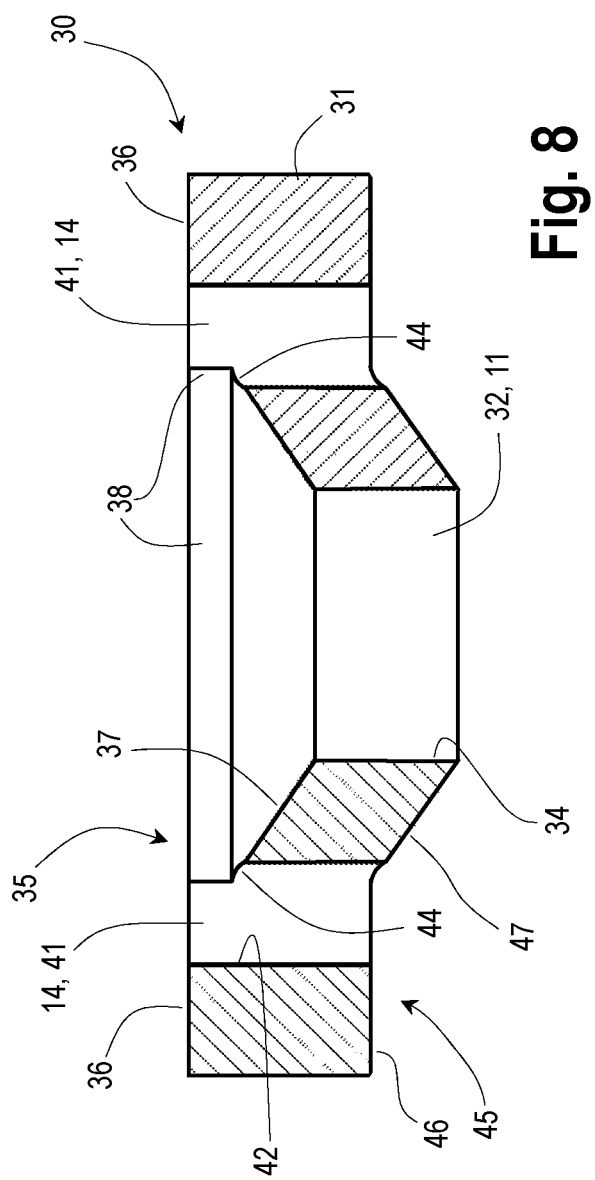

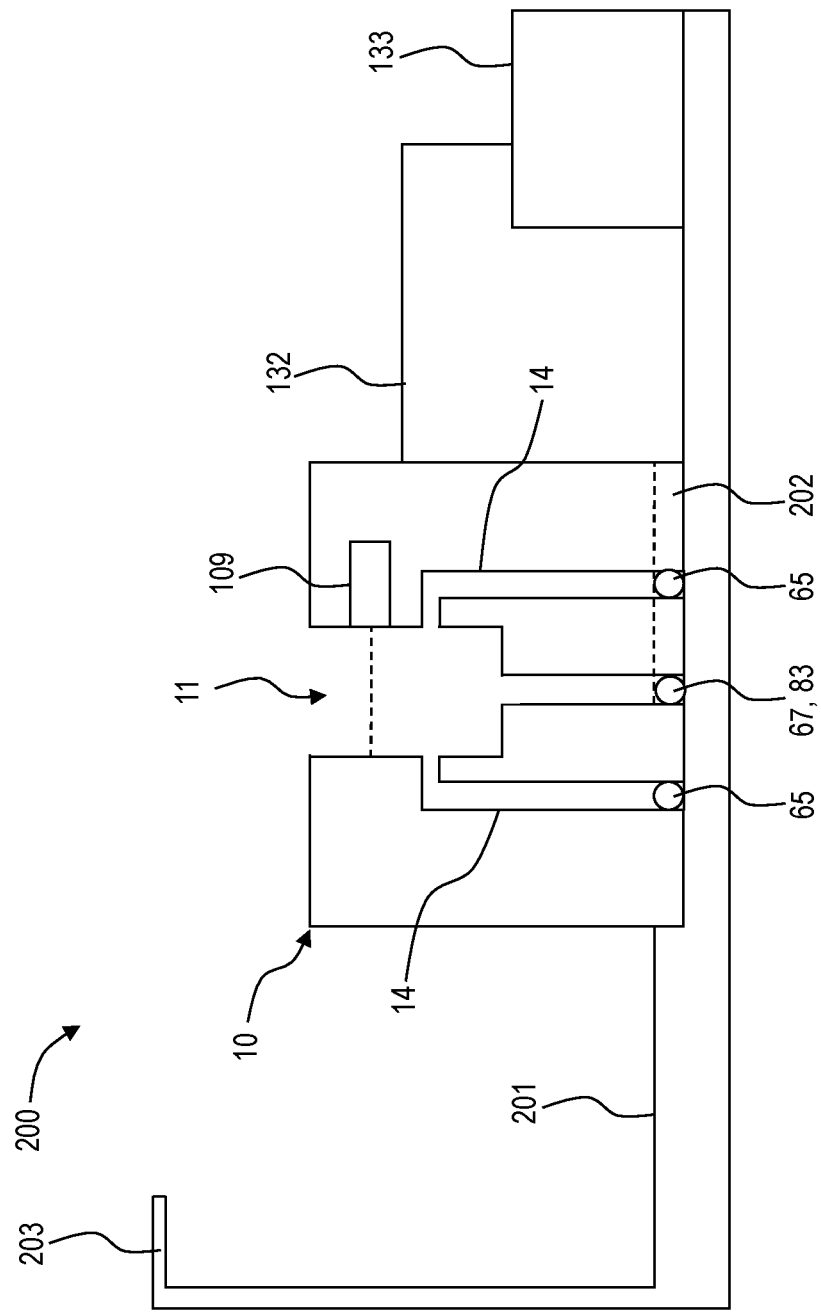

DECONTAMINATION STATION AND METHODS OF MAKING AND USING THE SAME

BACKGROUND

The disclosed subject matter relates to systems and methods for decontaminating a stylus of a coordinate measuring machine (CMM).

A CMM is an apparatus or system that can measure physical attributes of a physical object placed within the CMM. The CMM can measure size, dimensions, and other geometry of the physical object. The CMM can sense discrete points on the object. The sensing can be performed using a stylus that is on or part of a probe of the CMM. By operation of the CMM, the stylus can be moved within the CMM from a particular point of reference. The stylus can be moved using a 3-dimensional Cartesian coordinate system, i.e. x-axis, y-axis, z-axis.

In operation, the stylus makes contact at specific or discrete points on the object to be measured and senses such contact. The sensing of such contact can be provided by physical contact of the object with the stylus that in turn causes a mechanism in the probe to displace. Displacement of the mechanism in the probe generates a signal which can be detected by an operating or control system of the CMM. The size and geometrical attributes of a particular stylus and/or probe can vary depending on the attributes of the CMM and the particular object to be assessed.

SUMMARY

Some embodiments are directed to a decontamination station that can include a head assembly and a first puck member. The head assembly can include a core bore, a core member inflow passage and an outlet port. The first puck member can be provided on the head assembly. The first puck member can include a puck bore and a puck member inflow passage. The core member inflow passage and the puck member inflow passage together can form an inflow passage for incoming gas. The core bore and the puck bore together can form a cleaning chamber for accepting a stylus to be de-contaminated. A gas flow can be provided into the inflow passage, through the cleaning chamber, and from the cleaning chamber out through the outlet port. The gas flow can be configured to provide decontamination of the stylus positioned in the cleaning chamber. The first puck member can be removably disposed upon the head assembly for supplementing the first puck member, for adjusting height of the cleaning chamber, by removing the first puck member or adding one or more additional puck members.

Some embodiments are directed to a decontamination station that can include a heads assembly, a first puck member and a second puck member. The head assembly can include a core bore, a core member inflow passage and an outlet port. The first puck member can be provided on the head assembly. The first puck member can include a first puck bore and a first puck member inflow passage. The second puck member can be provided on the first puck member. The second puck member can include a second puck bore and a second puck member inflow passage. The core member inflow passage, the first puck member inflow passage and the second puck member inflow passage together can form an inflow passage for incoming gas. The core bore, the first puck bore and the second puck bore together can form a cleaning chamber for accepting a stylus to be de-contaminated. A gas flow can be provided into the inflow passage, through the cleaning chamber, and from the cleaning chamber out through the outlet port. The gas flow can be configured to provide decontamination of the stylus positioned in the cleaning chamber. The first puck member and the second puck can be removably disposed upon the head assembly for adjusting height of the cleaning chamber.

Some embodiments are directed to a coordinate measuring machine (CMM) that can include a controller, a probe movement mechanism, a stylus provided on the probe and a decontamination station. The decontamination station can include a head assembly, a first puck member and a second puck member. The head assembly can include a core bore, a core member inflow passage and an outlet port. The first puck member can be provided on the head assembly. The first puck member can include a first puck bore and a first puck member inflow passage. The second puck member can be provided on the first puck member. The second puck member can include a second puck bore and a second puck member inflow passage. The core member inflow passage, the first puck member inflow passage and the second puck member inflow passage together can form an inflow passage for incoming gas. The core bore, the first puck bore and the second puck bore together can form a cleaning chamber for accepting a stylus to be de-contaminated. A gas flow can be provided into the inflow passage, from the inflow passage to the cleaning chamber through a chamfer opening, and from the cleaning chamber out through the outlet port. The gas flow can be configured to provide decontamination of the stylus positioned in the cleaning chamber. The first puck member and the second puck can be removably disposed upon the head assembly for adjusting height of the cleaning chamber.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 8 is a cross-section view taken along line 8-8 of FIG. 6.

FIG. 9 is a schematic diagram of a stylus cleaning module in accordance with principles of the disclosed subject matter.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Contaminants on a stylus of a CMM can introduce errors into operation of the CMM. For example, the contaminant can be disposed between the stylus and the object during measurement. Such can result in inaccurate measurements and inefficient operation of the CMM.

Current technology can provide for cleaning a stylus using a manual process. However, such manual process increases the chances of human error resulting from a human engaging with the CMM. The stylus of the CMM can be very delicate. Accordingly, a human engaging with the stylus, so as to clean the stylus by hand, can result in damage to the stylus. Additionally, human error can occur when an operator, after cleaning the stylus, places the stylus in an incorrect place or position in the CMM. Such incorrect position of the stylus can cause the CMM to operate incorrectly or crash.

Figure 1:
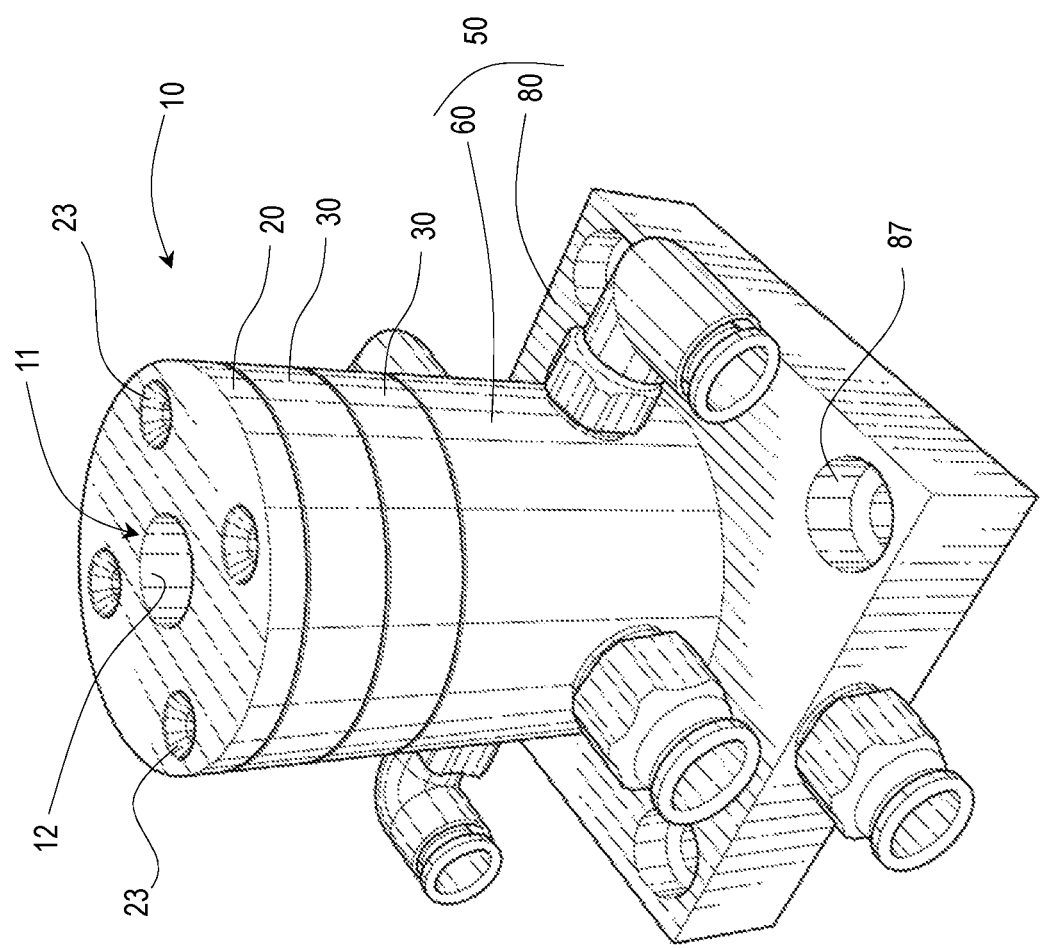
FIG. 1 is a perspective view of a decontamination station in accordance with principles of the disclosed subject matter.
Figure 3:
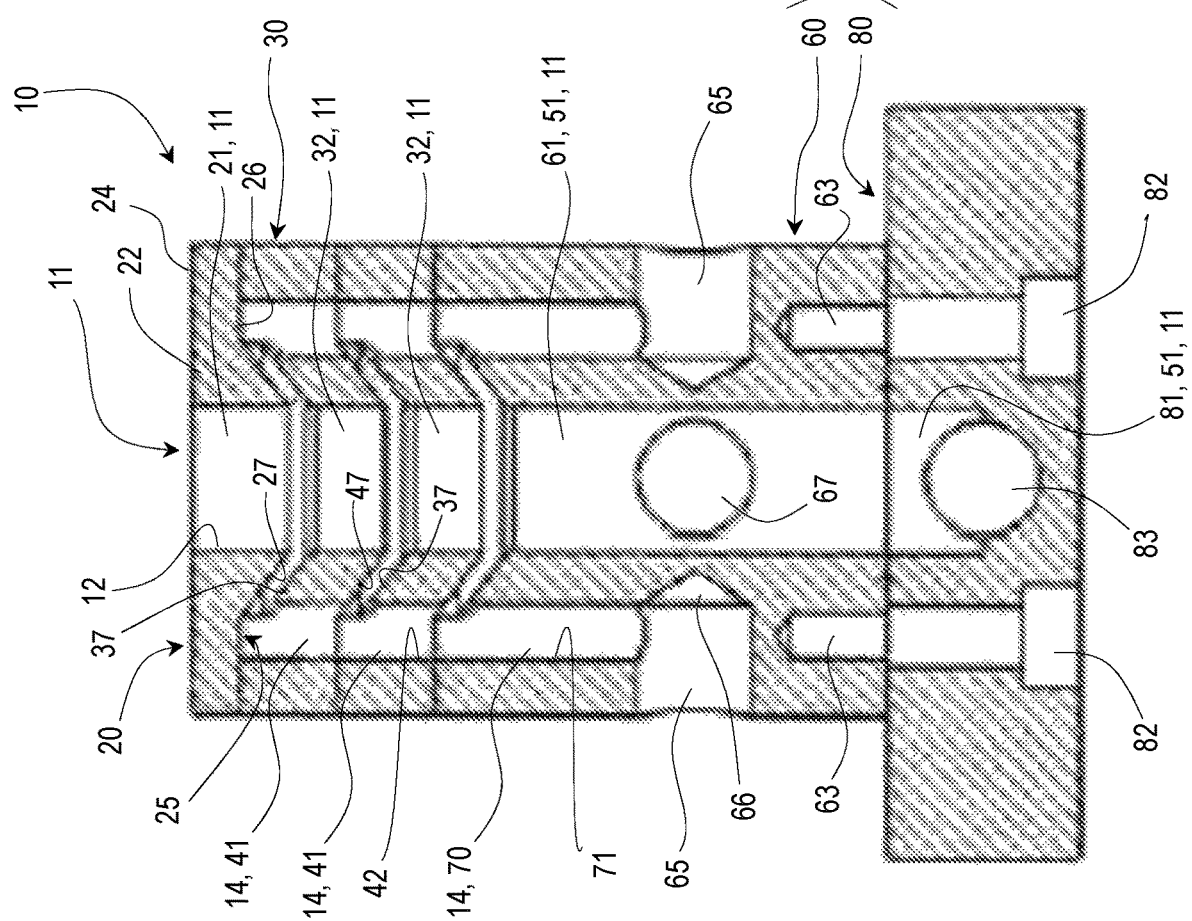
FIG. 3 is a cross-sectional view of a decontamination station in accordance with principles of the disclosed subject matter.
Figure 6:
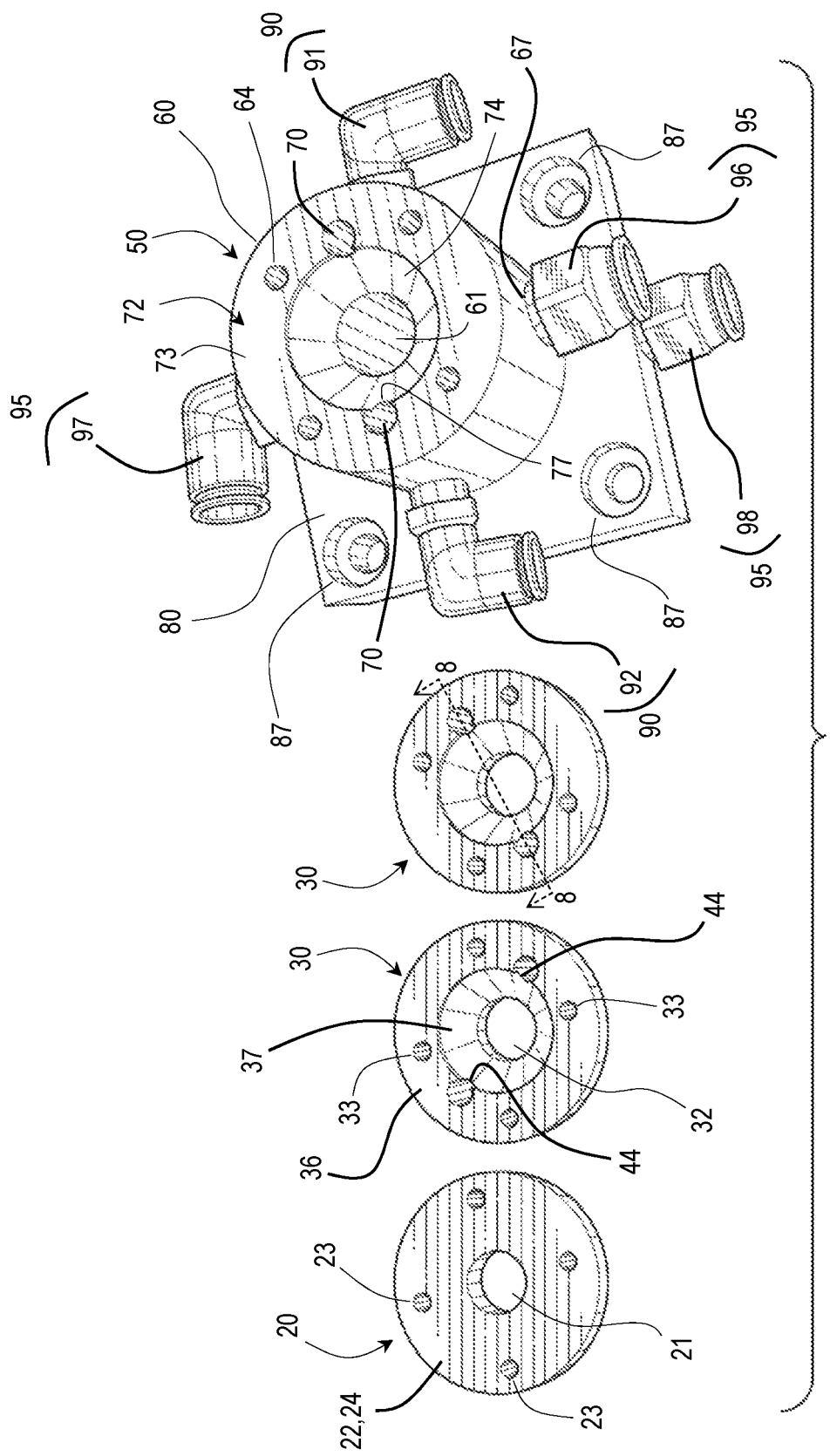
FIG. 6 is a perspective view of a decontamination station in a dis-assembled state in accordance with principles of the disclosed subject matter.

FIG. 1 is a perspective view of a decontamination station 10 in accordance with principles of the disclosed subject matter. FIG. 3 is a cross-sectional view of a decontamination station of the disclosure. Additionally, FIG. 6 is a perspective view of a decontamination station in a disassembled state in accordance with principles of the disclosed subject matter. The decontamination station 10 can provide an automatic cleaning process that eliminate or reduce human intervention and, as a result, human error. Also, since human intervention can be reduced or eliminated, the decontamination station of the disclosure can be used to enhance automation of inspection of an object in the CMM.

The decontamination station 10 can include a station cap 20, one or more puck members 30, and a head assembly 50. The head assembly 50 can include a core member 60 and a base member 80. The decontamination station can also include a cleaning chamber 11 and an inflow passage 14. The cleaning chamber 11 can extend through the station cap 20, through each of the puck members 30, through the core member 60, and into the base member 80. Accordingly, the cleaning chamber 11 can extend down through various components of the decontamination station 10. A height of the decontamination station 10 can be increased by adding one or more additional puck members 30. A height of the decontamination station 10 can be decreased by removing one or more puck members 30. As a result, the arrangement provides for a size of the cleaning chamber 11 to be adjusted so as to adapt to the size of a particular stylus or probe. That is, any number of pucks 30, including none, can be stacked on top of the core member 60 in order to achieve a desired size of the cleaning chamber 11.

Figure 2:
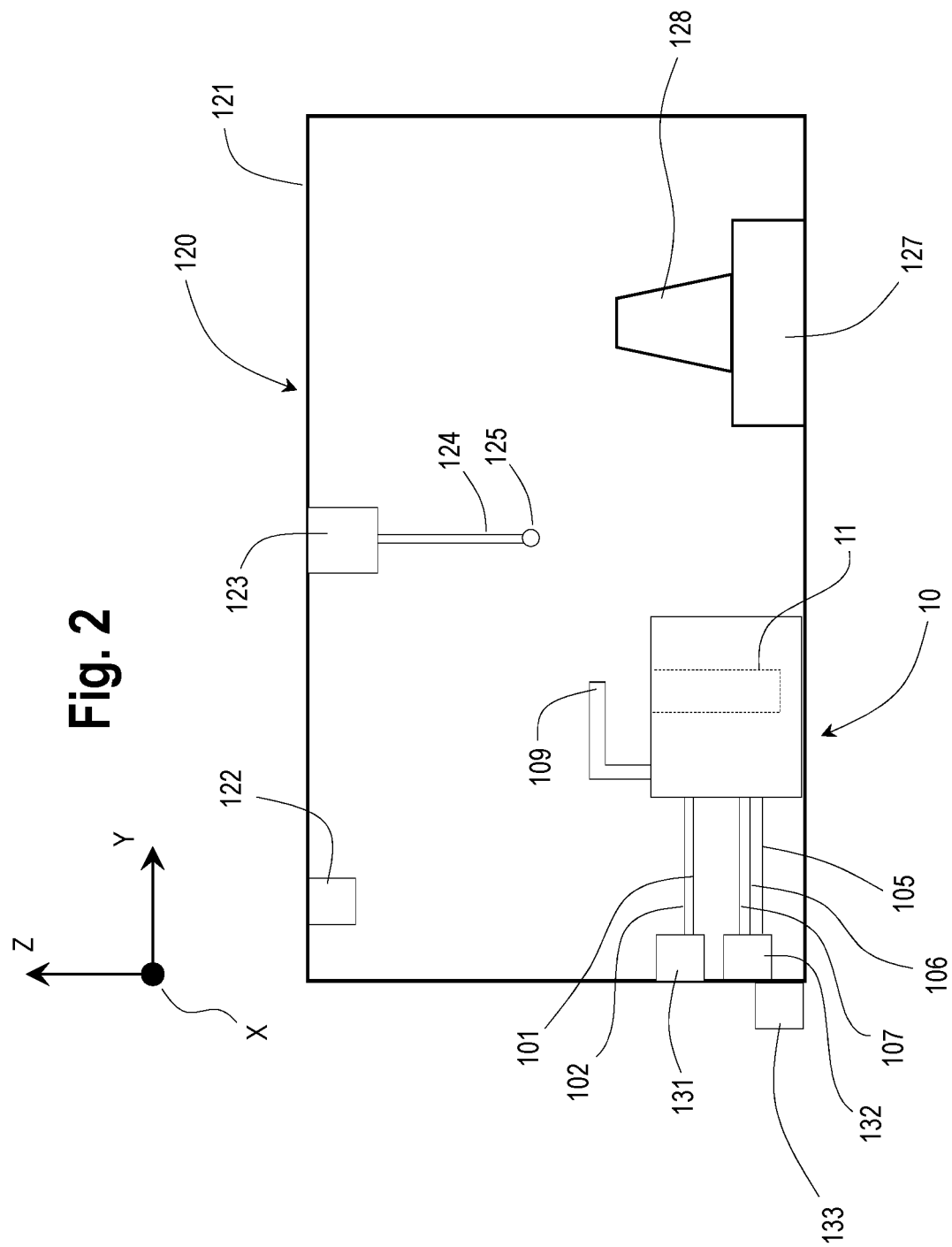
FIG. 2 is a schematic view of a coordinate measuring machine (CMM) in accordance with principles of the disclosed subject matter.

FIG. 2 is a schematic diagram of a CMM 120 in combination with a decontamination station 10 in accordance with principles of the disclosed subject matter. The CMM 120 can include a CMM housing 121. The CMM housing 121 can support and/or contain the various components of the CMM 120. The CMM 120 can include a controller 122. The controller 122 can control the various components of the CMM 120. The controller 122 can be connected to such various components via wires or wirelessly. The CMM 120 can also include a probe movement mechanism 123. The probe movement mechanism 123 can control and provide movement of the probe 124 and the stylus 125. The stylus 125 can be attached to the probe 124 or can be a part of the probe 124. For example, the probe movement mechanism 123 can provide movement of the probe 124 and stylus 125 along the X-, Y-, Z-axes in a 3-dimensional Cartesian coordinate system. The probe movement mechanism 123 can be in the form of a "bridge" or similar structure.

The decontamination station 10 can be placed within a CMM 120 so as to be part of the CMM, as shown in FIG. 2. Alternatively, the decontamination station 10 can be placed proximate or adjacent to the CMM 120. In either case, positioning of the decontamination station 10 can be provided so that that a stylus 125 of the CMM 120 can be moved into the cleaning chamber 11, i.e. when cleaning of the stylus 125 is desired.

Figure 5:
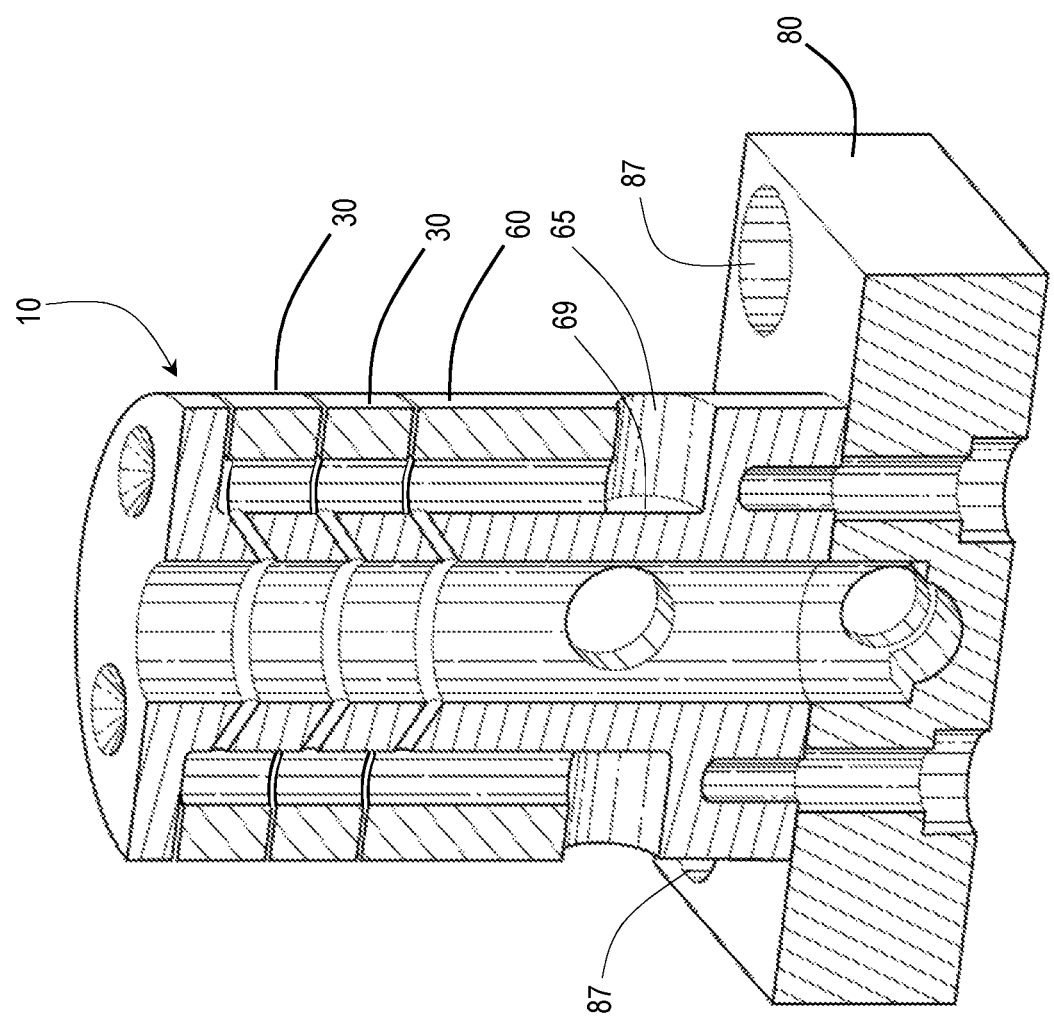
FIG. 5 is a perspective cross-sectional view of a decontamination station in accordance with principles of the disclosed subject matter.

The head assembly 50 can include the core member 60 and the base member 80. The base member 80 can secure the decontamination station 10 to an appropriate surface any appropriate manner. For example, the base member 80 can include a plurality of holes or apertures 87, as shown in FIGS. 5 and 6. A suitable fastener can extend through the holes 87 and into a suitable support surface. For example, the support surface can be a top surface of a measuring table of the CMM 120. The support surface can be some other structure of the CMM 120 or a structure adjacent to the CMM 120. The fastener such as but not limited to a screw or bolt can pass through the holes 87 and secured to the table of the CMM 120.

As shown in FIG. 3, the core member 60 can be supported upon the base member 80. The base member 80 can include holes 82. The core member 60 can include lower threaded bolt hole 63 corresponding to the holes 82 in the base 80. A suitable fastener can pass through the hole 82 and be threaded into the lower threaded bolt hole 63. The hole 82 can include or be in the form of a counterbore bolt hole so that the head of the particular fastener can be received into the hole 82. As a result, the fastener (and more specifically the head of the fastener) that attaches the base member 80 to the core member 60 can be recessed into the base number 80.

As shown in FIG. 8, puck member 30 can include a puck body 31. A puck bore 32 can be provided in a vertical direction through a center of the puck body 31. The puck bore 32 can form, in part, the cleaning chamber 11. The puck body 31 can include one or more puck attachment bolt holes 33, as shown in FIG. 6. The puck attachment bolt holes 33 can run vertically through the puck body 31 and be positioned around or about the puck body 31. The puck attachment bolt holes 33 can be positioned about a periphery of the puck member 30 as shown in FIG. 6, for example. The holes 33 can be provided to attach the one or more puck members 30 onto the head assembly 50, and more specifically onto the core member 60. Size of the holes 33 can vary depending on the particular geometry of the decontamination station 10 and the size of the fasteners intended to be used, for example.

Each of the puck members 30 can be similarly constructed. As shown in FIG. 6 and FIG. 8, the puck member 30 can include a bifurcated upper surface 35. The bifurcated upper surface 35 can include a ring outer surface 36 and a ring chamfer surface 37. The ring outer surface 36 can be flat. The ring chamfer surface 37 can be angled or chamfered with respect to the ring outer surface 36. The puck member 30 can include an annular shoulder 38. The annular shoulder 38 can include or be in the form of a vertical surface or ridge extending around a periphery of the ring chamfer surface 37. At a lower extent, the annular shoulder 38 can adjoin the ring chamfer surface 37. At an upper extent, the annular shoulder 38 can adjoin the ring outer surface 36. The ring chamfer surface 37 can be positioned about and around the puck bore 32. The ring chamfer surface 37 can be positioned about and adjoin an inner surface 34 of the puck member 30. The ring outer surface 36 can be positioned about and encircle the ring chamfer surface 37.

The puck member 30 can also include a bifurcated lower surface 45. The bifurcated lower surface 45 can include a ring outer surface 46 and a ring chamfer surface 47. The ring chamfer surface 47 can be angled or chamfered with respect to the ring outer surface as shown in FIG. 6 and FIG. 8. The ring outer surface 46 can be positioned about and encircle the ring chamfer surface 47.

The structure of the puck member 30 can be conducive to nesting of a first puck atop a second puck, a third puck atop the second puck, and so forth.

The puck member 30 can include a puck member inflow passage 41. The puck member inflow passage 41 can constitute a part of the inflow passage 14 of the decontamination station 10. The inflow passage 14 can include the puck member inflow passage 41 and a core member inflow passage 70. The puck member inflow passage 14 can be a vertical hole or bore that extends through the puck member 30 as shown in FIG. 3 and FIG. 6. The puck member inflow passage 41 can include an inner surface 42. The puck member inflow passage 41 can be positioned, as shown in FIGS. 6 and 8, such that the puck member inflow passage 41 straddles or crosses over between the ring chamfer surface 37 and the ring outer surface 36. As a result of the crossover of the puck member inflow passage 41 between the surfaces 35, 37, a chamfer opening 44 is created. The size of the chamfer opening 44 can be varied, in manufacture of the decontamination station 10, by how much the chamfer opening 44 crosses into the ring chamfer surface 37. As the puck member inflow passage 41 crosses or cuts further into the ring chamfer surface 37, of the bifurcated upper surface 35, a size of the chamfer opening 44 can be increased. Accordingly, in manufacture of the puck member 30, the size of the chamfer opening 44 can be varied depending on the amount of airflow desired. As shown in FIG. 8, the puck member inflow passage 41 can also straddle or cross over between the ring outer surface 46 and the ring chamfer surface 47, i.e. on a lower side of the puck member 30 as shown in FIG. 8.

As a result of the arrangement of the puck member inflow passage 41 relative to the ring chamfer surface 37, the chamfer opening 44 is provided. Thus, an airflow path is created through the chamfer opening 44 and along the ring chamfer surface 37. Specifically, air can flow through the puck member inflow passage 41, through the chamfer opening 44, down over the ring chamfer surface 37, and into the cleaning chamber 11.

When two puck members 30 are nested together, such as shown in FIG. 3, the ring chamfer surface 47 of the upper disposed puck member 30 can be parallel with and spaced from the ring chamfer surface 37 of the lower disposed puck member 30. The spacing between the surfaces 37, 47 can correspond to and is a result of the annular shoulder 38. That is, a height of the annular shoulder 38 can correspond to and dictate the vertical distance between the surfaces 37, 47. The ring chamfer surface 47 can be of the same angle, relative to vertical, as the ring chamfer surface 37. Such relationship is illustrated in FIG. 3.

The station cap 20 can include a cap body 22. As shown in FIG. 3 and FIG. 6, an upper, outer surface 24 of the cap body 22 can be flat. A cap bore 21 can extend through the station cap 20. The cap bore 21 can be vertically oriented and extend through a center axis of the station cap 20. The cap bore 21 can constitute a part of the cleaning chamber 11.

A lower surface of the station cap 20 can be of geometry so as to mate with the bifurcated upper surface 35 of a puck member 30. Additionally, the lower surface of the station cap 20 can mate with a core bifurcated surface 72 of the core member 60. That is, in one arrangement all the puck members 30 are removed and the station cap 20 can be positioned directly upon the core member 60. The core bifurcated surface 72 (of the core member 60) can include a ring outer surface 73 and a ring chamfer surface 74. Accordingly, such structure can provide geometry so as to match up or mate with either a lower surface of one of the puck members 30 or station cap 20, i.e. if all the puck members are removed. Further, the core member 60 can include a chamfer opening 77 at the ring chamfer surface 74 and the core member inflow passage 70 in a manner as described above with to the chamfer openings 44 in the puck member 30.

The lower surface of the station cap 20 can be of geometry so as to match up or mate with the bifurcated upper surface 35, of a puck member 30, in similar manner that another puck member would match up. More specifically, the station cap 20 can include a cap bifurcated surface 25. The cap bifurcated surface 25 can include a ring outer surface 26 and a ring chamfer surface 27. The ring outer surface 26 can be flat. The ring chamfer surface 27 can be angled or chamfered wrt the ring outer surface 26. The angle of the ring chamfer surface 27 can be the same as the angle of the ring chamfer surface 37 and/or the ring chamfer surface 47.

Figure 4:
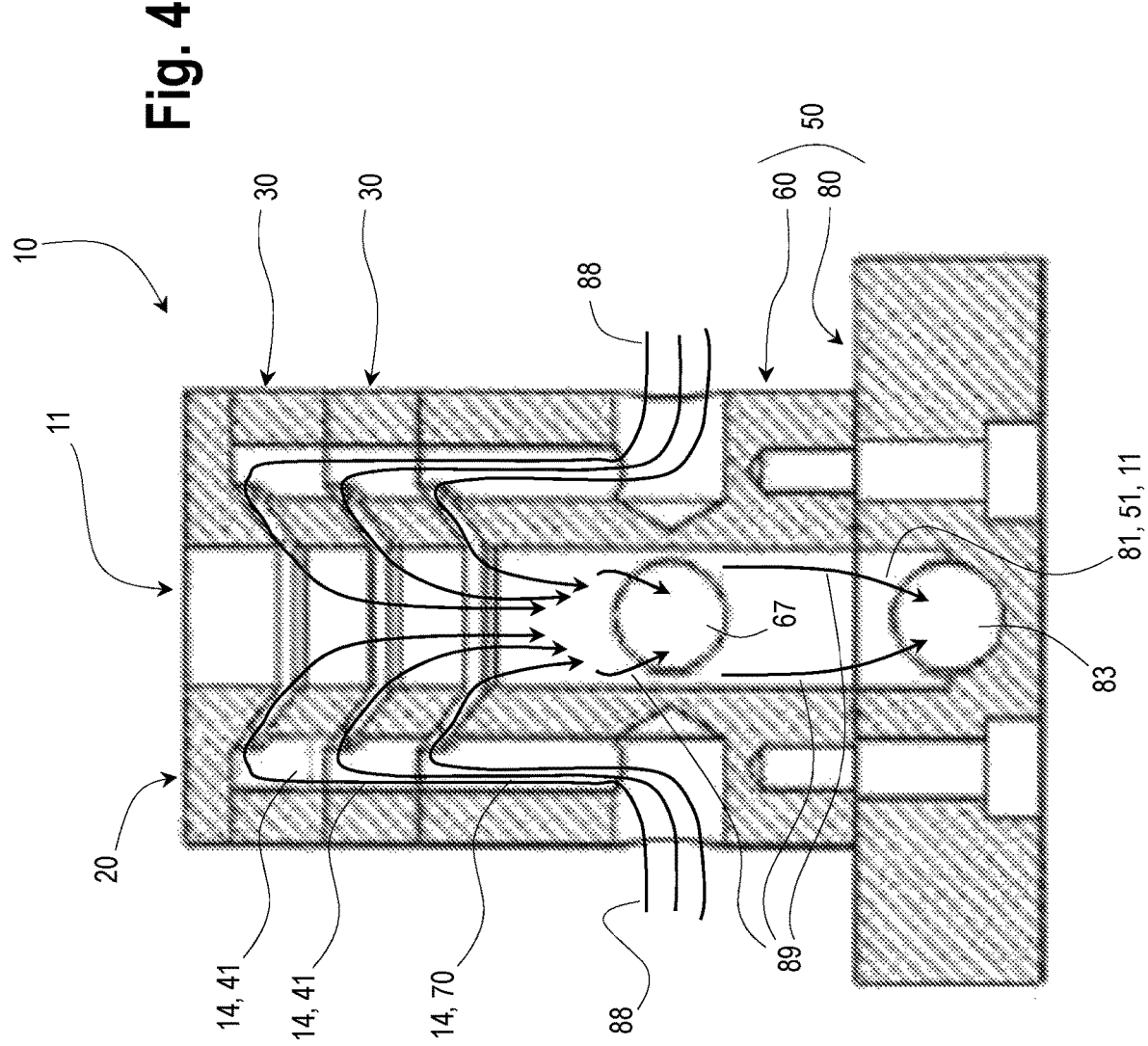
FIG. 4 is a cross-sectional view of a decontamination station showing gas flow in accordance with principles of the disclosed subject matter.

The cap body 22 can serve as a cap, top or terminus to the inflow passage 14. In other words, the cap body 22 can serve as a stopper or cut off to air flowing up through the inflow passage 14, and so as to divert air into the cleaning chamber 11. In operation, air flowing up through the puck member inflow passage 41 can encounter either the ring outer surface 26 or the ring chamfer surface 27 of the cap bifurcated surface 25. As a result, air will flow by or past the ring chamfer surface 27 and through the chamfer opening 44 of the particular puck member 30. The ring chamfer surface 27 (of the cap bifurcated surface 25) can be spaced from the ring chamfer surface 37 of the uppermost positioned puck member 30, as shown in FIG. 3. Such spacing/geometry is a result of the annular shoulder 38. Thus, the air can flow down between the ring chamfer surfaces 27, 37 and into the cleaning chamber 11. Such airflow, as shown by arrows 88 in FIG. 4, can create airflow past a stylus (positioned in the cleaning chamber 11) in a knifing manner. As a result, contaminants can be stripped away from and dislodged from the stylus. Additionally, such knifing airflow can be assisted by vacuum pressure. The vacuum pressure, resulting in airflow as shown by arrows 89 in FIG. 4, can be applied via outlet ports 67, as well as outlet port 83. Further details are described below.

The core member 60 can include a core member bore 61. The core member bore 61 can constitute a part of the cleaning chamber 11. As shown in FIG. 3, the core member bore 61 can be in communication with the puck bores 32 and the cap bore 21.

The core member 60 can include a core member inflow passage 70. The core member inflow passage 70 can form a part of the inflow passage 14. The core member inflow passage 70 can include an inner surface or inner diameter 71. Accordingly, the inflow passage 14 can be formed by a collection of the core member inflow passage 70 and the puck member inflow passage 41 of each of the puck members 30, if any, that are stacked on top of the core member 60. The core member inflow passage 70 can be in communication with an inlet side port 65. The core member inflow passage 70 can extend through the core member 60 in a vertical manner as shown in FIG. 3 and FIG. 6. The inlet side port 65 can extend into the core member 60 from a side of the core member 60. The inlet side port 65 can intersect with the core member inflow passage 70 so as to provide communication between the port 65 and the passage 70. In manufacture of the core member 60, the core member inflow passage 70 can be formed by drilling in from the top of the core member 60. The inlet side port 65 can be formed by drilling in from a side of the core member 60. As a result, a concavity 66 can be generated as a result of the drilling process and the tip of the drill.

As shown in FIG. 3 and FIG. 6, an arrangement that includes the inlet side port 65 and core member inflow passage 70 can be provided on both sides of the core member 60. That is, as shown in FIG. 3, an inlet side port 65 is provided on the left side of the core member 60 and an inlet side port 65 is provided on the right side of the core member 60. Additional inlet side ports and/or core member inflow passages can be provided if desired. For example, rather than the two such arrangement illustrated, there may be four such arrangements. Each of the inlet side port 65 can be attached to a suitable fitting as described further below.

Referring to FIG. 3, the outlet port 67 can provide vacuum pressure or an outflow to the cleaning chamber 11. Accordingly, as air flows down through the cleaning chamber 11, across a stylus 25 positioned in the cleaning chamber 11, the air can then exit through the outlet port 67. A first outlet port 67 is shown in FIG. 3. As will be described in further detail with respect to FIG. 6, an additional or second outlet port 67 can be provided in the cleaning chamber 11 and on an opposing side of the cleaning chamber 11 with respect to outlet portion 67 shown in FIG. 3.

The base member 80 can include a base member bore 81. The base member bore 81 can constitute a part of the cleaning chamber 11. As shown in FIG. 3, the base member bore 81 can be in communication with the core member bore 61. The core member bore 61 and the base member bore 81 can together constitute what can be characterized as a core bore 51, which is provided in the head assembly 50. Accordingly, the cleaning chamber 11 can include the base member bore 81, the core member bore 61, the puck bore 32 (of any pucks 30 that are stacked on the core member 60), and the cap bore 21. The diameter of each of such portions or segments of the cleaning chamber 11 can be the same or similar. As a result, a continuous, uniform inner surface or inner diameter 12 can be provided for the cleaning chamber 11.

The base member 80 can include an outlet port 83. The outlet port 83 can be provided at a lower end of the base member bore 81. That is, since the bore 81 forms a lowermost extent of the cleaning chamber 11, the outlet port 83 can be provided at a lower end of the cleaning chamber 11. In addition to the outlet ports 67, the outlet port 83 can also provide vacuum pressure or an outflow to the cleaning chamber 11. Accordingly, as air flows down through the cleaning chamber 11, and across a stylus 125 positioned in the cleaning chamber 11, the air can also exit through the outlet port 83, as shown by the arrows 89 in FIG. 4. Thus, the outlet ports 67, 83, can provide a highly efficient vacuum pressure or outflow of air so as to enhance airflow down through the cleaning chamber 11. FIG. 3 shows one outlet port 83. The decontamination station 10, and specifically the base member 80, can include additional outlet ports on the base member 80 if desired.

Referring to FIG. 6, the various ports 65, 67, 83, which provide airflow into and out of the decontamination station 10, can be provided with suitable inlet fittings 90 and outlet fittings 95. For example, the various ports 65, 67, 83 can be provided with internal diameter threading so as to accept external threading on an appropriately sized fitting 90, 95. Rather than such threaded engagement, other engagement mechanisms can be utilized. For example, a friction fit arrangement can be utilized so as to attach a fitting into a port.

The first inlet side port 65 (on the left-hand side as shown in FIG. 3) can be provided with a first inlet fitting 91, as shown in FIG. 6. A second inlet side port 65 (on the right-hand side as shown in FIG. 3) can be provided with a second inlet fitting 92, as shown in FIG. 6. The first outlet port 67, as shown in FIG. 3, can be provided with a first outlet fitting 96, as shown in FIG. 6. A second outlet port 67 (not viewable in the cross-section view of FIG. 3) can be provided with a second outlet fitting 97, as shown in FIG. 6. The outlet port 83 in the base member 80, as shown in FIG. 3, can be provided with a third outlet fitting 98, as shown in FIG. 6.

FIG. 5 is a perspective side view of a decontamination station similar to the decontamination station 10 of FIG. 3. In contrast to the decontamination station of FIG. 3, the decontamination station of FIG. 5 does not include the concavity 66 at the end of the inlet side ports 65. Rather, a flat surface 69 is provided at the end or terminus of the inlet side port 65. For example, such flat surface 69 might be constructed, in manufacture of the decontamination station 10, utilizing a standard point drill followed up by a drag bit.

Figure 7:
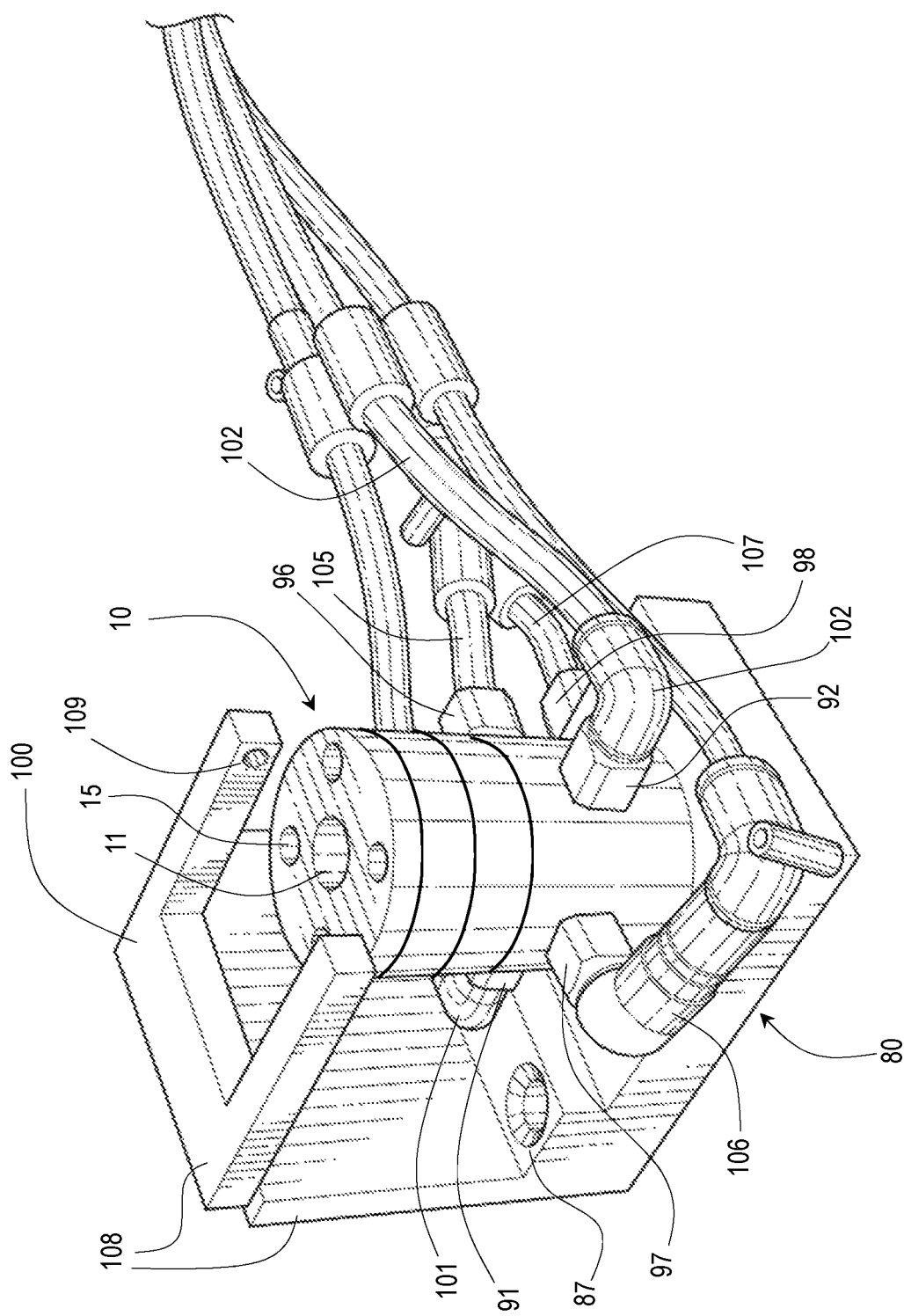
FIG. 7 is a perspective view of a decontamination station with a jig in accordance with principles of the disclosed subject matter.

FIG. 7 is a perspective view of a decontamination station 10 that includes a jig 100 in accordance with principles of the disclosed subject matter. FIG. 7 shows further features of fitting and hose attachments to the decontamination station 10. The first inlet fitting 91 can be attached to a first pressure hose 101. The second inlet fitting 92 can be attached to a second pressure hose 102. The first outlet fitting 96 can be attached to a first vacuum hose 105. The second outlet fitting 97 can be attached to a second vacuum hose 106. The third outlet fitting 98 can be attached to a third vacuum hose 107.

The base member 80 of FIG. 7 can differ from the base member 80 of FIG. 3. As shown in FIG. 7, the base member 80 of FIG. 7 can include holes or attachment holes 87 provided on a side of the base member 80. The decontamination station 10 can be provided with a light sensor support 108. The light sensor support 108 can support a light sensor 109. The light sensor 109 can be utilized to detect the presence of a stylus 125 and/or a probe 124 that supports the stylus 125. For example, the light sensor 109 can detect a break in an emitted light beam and/or a difference in reflected light due to the stylus 125 and/or probe 124 being positioned within the light beam. Such situation can be present upon a probe 124 and/or stylus 125 being lowered into the cleaning chamber 11 of the decontamination station 10. Upon the light sensor 109 detecting the probe 124 and/or stylus 125 of the CMM 120, the controller 122 of the CMM 120 can start up both the pressure apparatus and the vacuum apparatus of the decontamination station 10. Accordingly, air can flow into the decontamination station 10, through the cleaning chamber 11, and be sucked out of the decontamination station 10 utilizing vacuum pressure, as described above.

Referring to FIG. 2, the decontamination station 10 can include or be associated with an air pressure apparatus 131. The decontamination station 10 can include or be associated with a vacuum apparatus 132. The air pressure apparatus 131 can provide airflow and air pressure to each of the first pressure hose 101 and the second pressure hose 102.

Accordingly, flow through the decontamination station 10 can be provided. The vacuum apparatus 132 can provide a suction or vacuum airflow to each of the first vacuum hose 105, the second vacuum hose 106, and the third vacuum hose 107. The decontamination station 10 can also include or be associated with a containment box 133. The containment box 133 can contain various debris and other contaminants or foreign materials that are removed, from the stylus 125 and/or probe 125, by the vacuum apparatus 132 and by operation of the decontamination station 10. The air pressure apparatus 131 and the vacuum apparatus 132 can be controlled by the controller 122.

The CMM 120 can include an object support 127. An object 128 can be positioned upon the object support 127. The CMM 120 can measure the geometry of the object 128 using the stylus 125. Upon completion of measuring the object 128 and/or at some time during the measurement of the object 128, the CMM 120 can clean the stylus 125 in accordance with the principles of the disclosed subject matter. Specifically, the controller 122 can move the stylus 125 (using the probe movement mechanism 123) over to the decontamination station 10. The controller 122 can lower the stylus 125 into the decontamination station 10. Such presence of the probe/stylus 124, 125 can be identified by the light sensor 109. Upon the controller 122 identifying presence of the stylus 125, operation of the decontamination station 10 can be initiated. Specifically, the controller 122 can startup the air pressure apparatus 131 and the vacuum apparatus 132 so as to provide decontamination to the stylus 125, i.e. upon the stylus 125 being dropped into the cleaning chamber 11. Accordingly, the stylus 125 can be efficiently and effectively cleaned of debris, contaminants, etc. using the principles of the disclosure.

Referring to FIG. 6, the station cap 20 can include one or more cap attachment holes 23, which can each be a bolt hole. Also, the core member 60 can include one or more holes 64. Each of the holes 64 can be a threaded bolt hole. A fastener, such as a bolt, can extend down through the cap attachment hole 23 (in the station cap 20), each of the puck attachment holes 33, and be threaded into the hole 64 in the core member 60. Other attachment mechanisms and/or other fasteners can be utilized. For example, the fastener utilized to attach the station cap 20, the puck member 30, and the core member 60 can be chamfered—so as to be received by a chamfered opening of the cap attachment hole 23. Referring to FIG. 7, the holes or bores 23, 33, 64 can collectively form an attachment hole 15 that serves to connect the various components together.

The air pressure apparatus 131 and the vacuum apparatus 132 can be separate and spaced away from the decontamination station 10. However, FIG. 9 is a schematic illustration of a stylus cleaning module 200 that can include the decontamination station 10 and the vacuum apparatus 132 integrated as a single unit on a base 201. The decontamination station 10 can be constructed as described above with the core member 60 of the decontamination station 10, the vacuum apparatus 132 and the contaminate box 133 mounted on and secured to the base 201. Further, the outlet ports 67, 83 can be connected to a vacuum line 202 formed in the base 201. The vacuum line 202 can be in fluid communication with the vacuum apparatus. The stylus cleaning module 200 can include a plurality of fine cleaning brushes supported on a mounting member 203 of the base 201. The brushes can be used for further manually cleaning of the stylus 125, if necessary.

Accordingly, the decontamination station 10 can include a puck style assembly that allows positive air pressure to be applied in an air knifing manner. The decontamination station 10 can use a vacuum to pull contaminants from the cleaning chamber 11 and from the stylus 125. A height of the decontamination station 10 can be adjusted by stacking more pucks or puck members 30 onto the base member 60 of the decontamination station 10. The decontamination station 10 allows automatic cleaning of a CMM stylus or styli 125 utilizing the movements of the CMM 120. For example, the stylus 125 can be automatically moved into the cleaning chamber 11 of the decontamination station 10 after the stylus 125 has performed a measuring process on an object 128 or on a set number of objects. The decontamination station 10 can utilize both positive air pressure and a vacuum. The positive air pressure can blow off contaminants on the stylus 125 or probe 124. The vacuum can remove such contaminants that were removed by the air blow off. The entire inner circumference of the cleaning chamber 11 can be used as an air blow knife. Accordingly, the decontamination station 10 can create an air knife around the entire circumference of the stylus 125. The decontamination station 10 can be made from a variety of materials. In particular, the decontamination station 10 can be made of aluminum.

The decontamination station 10 can allow an enhanced automated cleaning process that ensures measuring equipment in the CMM 120 is clean and ready for operation. The decontamination station 10 allows substantial versatility in height of a cleaning chamber 11, for the stylus 125 and probe 124, due to the ability to add or remove puck members 30 from a stack of pucks on the base member 60 of the decontamination station 10 The decontamination station 10 can be different from known apparatus because of its versatility in height, air knife affect, and vacuum arrangement. The decontamination station 10 can utilize an entire inner circumference of a cleaning chamber 11, of the decontamination station 10, as an air blow knife. Such arrangement is in contrast to known apparatus that can utilize an individual ported design that does not collect debris. The decontamination station of the disclosure can ensure that the full surface area of the stylus 125 is cleaned.

As described above, in operation of the decontamination station 10, positive air pressure can enter from side ports. The positive air pressure can be directed upward to each one of the puck members 30. The positive air pressure can then be dispersed around the circumference of an inner diameter of the cleaning chamber 11 of the decontamination station 10. In operation, a vacuum can remove contamination from the two opposite sides of the air blow, and from a bottom port that is connected to an inner diameter of the cleaning chamber 11. Thus, the decontamination station 10 can provide a reliable and efficient cleaning of the stylus without human intervention.

While certain embodiments of the invention are described above, it should be understood that the invention can be embodied and configured in many different ways without departing from the spirit and scope of the invention.

For example, embodiments are disclosed above in which the decontamination station 10 is described as providing a flow of "air" over a probe or stylus. However, embodiments are intended to include or otherwise cover other gases and are not specifically limited to air or ambient gas. For example, the decontamination station 10 could operate utilizing inert gas, water, water with additive, or some other type of fluid.

For example, embodiments are disclosed above in which a particular number of ports, inlets, or outlets are described. However, embodiments are intended to include or otherwise cover a varied number of ports, inlets, or outlets, which may be positioned about the decontamination station 10 as may be desired.

For example, embodiments are disclosed above in which "bolts" are described as fasteners to secure various components together. However, embodiments are also intended to cover other fasteners including screws, friction fit fasteners, snap fit fasteners, rivet type fasteners, and other fasteners.

Features, elements and/or characteristics described with respect to one embodiment of the disclosure may be variously used with other embodiments of the disclosure as may be desired.

Various components of embodiments of the disclosure can be made from any of a variety of materials including, for example, steel, metal, plastic, plastic resin, nylon, composite material, and/or rubber, for example, or any other material as may be desired.

A variety of production techniques can be used to make the apparatuses as described herein. For example, suitable casting and/or injection molding and other molding techniques, extrusion and other manufacturing techniques can be utilized. Also, metal stamping or cutting can be utilized.

What is claimed is:

1. A decontamination station comprising:
a head assembly that includes a core bore and a core member inflow passage, and the head assembly further includes an outlet port; and
a first puck member provided on the head assembly, the first puck member includes a puck bore and a puck member inflow passage, and
(a) the core member inflow passage and the puck member inflow passage together form an inflow passage for incoming gas,
(b) the core bore and the puck bore together form a cleaning chamber for accepting a stylus to be de-contaminated;
wherein gas flow is provided into the inflow passage, through the cleaning chamber, and from the cleaning chamber out through the outlet port, and the gas flow is configured to provide decontamination of the stylus positioned in the cleaning chamber; and
wherein the first puck member is removably disposed upon the head assembly for supplementing the first puck member, for adjusting height of the cleaning chamber, by removing the first puck member or adding one or more additional puck members.

2. The decontamination station of claim 1, further including a station cap, the station cap is provided atop the first puck member so as to divert gas flowing through the inflow passage to the cleaning chamber, and the station cap includes a cap bore, and
the cap bore forms the cleaning chamber, along with the core bore and the puck bore.

3. The decontamination station of claim 1, wherein the first puck member includes a bifurcated upper surface that includes a ring outer surface and a ring chamfer surface, the ring outer surface is positioned about the ring chamfer surface, and the ring chamfer surface is positioned about the puck bore.

4. The decontamination station of claim 3, wherein the puck member further includes an annular shoulder that is positioned between the ring outer surface and the ring chamfer surface.

5. The decontamination station of claim 3, wherein the puck member inflow passage cuts through both the ring outer surface and the ring chamfer surface so as to provide a chamfer opening.

6. The decontamination station of claim 1, further including a second puck member, of the one or more additional puck members, and
the second puck member includes a further puck bore and a further puck member inflow passage, and
the further puck bore forms the cleaning chamber along with the puck bore, of the first puck, and the core bore.

7. The decontamination station of claim 6, wherein the further puck member inflow passage forms the inflow passage, along with the puck member inflow passage, of the first puck, and the core member inflow passage.

8. The decontamination station of claim 6, further including a station cap, the station cap is provided atop the first puck member so as to divert gas flowing through the inflow passage to a chamfer opening, and the chamfer opening provides gas flow to the cleaning chamber.

9. The decontamination station of claim 8, further including a bolt, and
the head assembly including a threaded bolt hole;
the first puck including a first puck attachment hole;
the second puck including a second puck attachment hole;
the station cap including a cap attachment hole; and
wherein the bolt passes through each of the first puck attachment hole, the second puck attachment hole, and the cap attachment hole, and
the bolt passes into the threaded bolt hole so as to secure the station cap, the first puck member, and the second puck member onto the head assembly.

10. The decontamination station of claim 1, wherein the head assembly including a core member and a base member, and the core member disposed upon the base member,
the core member includes a core member bore,
the base member includes a base member bore, and
the core member bore and the base member bore together form the core bore.

11. The decontamination station of claim 10, wherein the base member including a further outlet port that is in communication with the cleaning chamber, the further outlet port provides outflow of gas from the cleaning chamber.

12. The decontamination station of claim 1, further including:
a first inlet fitting that is attached to the inflow passage, and the first inlet fitting is configured to attach to a pressure hose to provide the gas flow; and
a first outlet fitting that is attached to the outlet port, and the first outlet fitting is configured to attach to a vacuum hose to provide the gas flow to be output from the outlet port.

13. A decontamination station comprising:
a head assembly that includes a core bore and a core member inflow passage, and the head assembly further includes an outlet port;
a first puck member provided on the head assembly, the first puck member includes a first puck bore and a first puck member inflow passage, and
a second puck member provided on the first puck member, the second puck member includes a second puck bore and a second puck member inflow passage, and
(a) the core member inflow passage, the first puck member inflow passage and the second puck member inflow passage together form an inflow passage for incoming gas, and
(b) the core bore, the first puck bore and the second puck bore together form a cleaning chamber for accepting a stylus to be de-contaminated;

wherein gas flow is provided into the inflow passage, through the cleaning chamber, and from the cleaning chamber out through the outlet port, and the gas flow is configured to provide decontamination of the stylus positioned in the cleaning chamber; and wherein the first puck member and the second puck are removably disposed upon the head assembly for adjusting height of the cleaning chamber.

14. The decontamination station of claim 13, further including a station cap, the station cap provided atop the second puck member so as to divert gas flowing through the inflow passage to the cleaning chamber.

15. The decontamination station of claim 14, wherein the first puck member includes a bifurcated upper surface that includes a ring outer surface and a ring chamfer surface, the ring outer surface is positioned about the ring chamfer surface, and the ring chamfer surface is positioned about the puck bore.

16. The decontamination station of claim 15, wherein the first puck member inflow passage cuts through both the ring outer surface and the ring chamfer surface so as to provide a chamfer opening, and the chamfer opening is configured to provide gas to pass from the inflow passage to the cleaning chamber.

17. A coordinate measuring machine (CMM) comprising:
a controller;
a probe movement mechanism;
a stylus provided on the probe; and
a decontamination station including:
  a head assembly that includes a core bore and a core member inflow passage, and the head assembly further includes an outlet port;
  a first puck member provided on the head assembly, the first puck member includes a first puck bore and a first puck member inflow passage, and
  a second puck member provided on the first puck member, the second puck member includes a second puck bore and a second puck member inflow passage, and (a) the core member inflow passage, the first puck member inflow passage and the second puck member inflow passage together form an inflow passage for incoming gas, and (b) the core bore, the first puck bore and the second puck bore together form a cleaning chamber for accepting a stylus to be de-contaminated;

wherein gas flow is provided into the inflow passage, from the inflow passage to the cleaning chamber through a chamfer opening, and from the cleaning chamber out through the outlet port, and the gas flow is configured to provide decontamination of the stylus positioned in the cleaning chamber; and wherein the first puck member and the second puck are removably disposed upon the head assembly for adjusting height of the cleaning chamber.

18. The CMM of claim 17, further including a station cap, the station cap is provided atop the second puck member so as to divert gas flowing through the inflow passage to the chamfer opening.

19. The CMM of claim 17, further including:
an air pressure apparatus that provides gas flow into the inflow passage; and
a vacuum apparatus that provides for gas flow through the outlet port.

20. The CMM of claim 19, wherein:
the inflow passage is a first inflow passage on a first side of the decontamination station, and the decontamination station further includes a second inflow passage on an opposing side of the decontamination station; and the outlet port is a first outlet port on a second side of the decontamination station, and the decontamination station further includes a second outlet port on an opposing side of the decontamination station.

* * * * *